US 7,999,957 B2

(12) United States Patent
Inazumi

(10) Patent No.: US 7,999,957 B2
(45) Date of Patent: Aug. 16, 2011

(54) INPUT POSITION SETTING METHOD, INPUT POSITION SETTING DEVICE, INPUT POSITION SETTING PROGRAM, AND INFORMATION INPUT SYSTEM

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1225 days.

(21) Appl. No.: 11/672,645

(22) Filed: Feb. 8, 2007

(65) Prior Publication Data

US 2007/0192691 A1     Aug. 16, 2007

(30) Foreign Application Priority Data

Feb. 16, 2006   (JP) ................................. 2006-039301

(51) Int. Cl.
   *G06F 3/12*       (2006.01)
(52) U.S. Cl. ........ 358/1.15; 358/474; 358/462; 715/700; 715/274; 345/157; 345/175; 382/274; 348/207.2
(58) Field of Classification Search ................... 358/474, 358/1.15, 462, 463; 715/700, 274, 723; 348/207.2, 348/231.99, 340, 345, E5.042, E5.024; 382/176, 382/171, 274
   See application file for complete search history.

(56) References Cited

U.S. PATENT DOCUMENTS

| | | | | |
|---|---|---|---|---|
| 5,657,434 A * | 8/1997 | Yamamoto et al. | ............ | 345/684 |
| 5,714,973 A * | 2/1998 | Takahashi et al. | ............ | 345/658 |
| 5,809,447 A * | 9/1998 | Kato et al. | ..................... | 701/211 |
| 6,288,702 B1 * | 9/2001 | Tachibana et al. | ............ | 345/671 |
| 6,879,323 B1 * | 4/2005 | Nagai et al. | ................... | 345/420 |
| 7,330,589 B2 * | 2/2008 | Watanabe | ...................... | 382/173 |
| 2003/0058279 A1 * | 3/2003 | Yamamoto | ..................... | 345/771 |
| 2004/0207674 A1 * | 10/2004 | Otsuki | ............................ | 347/19 |
| 2006/0100519 A1 * | 5/2006 | Miyaoka et al. | ............. | 600/453 |
| 2006/0210121 A1 * | 9/2006 | Nakano et al. | ................. | 382/117 |
| 2006/0238622 A1 * | 10/2006 | Shimosato | ................ | 348/220.1 |
| 2008/0180392 A1 * | 7/2008 | Kishi et al. | .................... | 345/156 |
| 2008/0239136 A1 * | 10/2008 | Kanai et al. | ................... | 348/340 |
| 2009/0164894 A1 * | 6/2009 | Takekawa et al. | ............ | 715/274 |
| 2010/0127704 A1 * | 5/2010 | Warntjes | ....................... | 324/309 |
| 2010/0157069 A1 * | 6/2010 | Sakamaki | ................. | 348/207.2 |

FOREIGN PATENT DOCUMENTS

| | | |
|---|---|---|
| JP | A 09-102046 | 4/1997 |
| JP | A 2000-331170 | 11/2000 |

* cited by examiner

*Primary Examiner* — Negussie Worku
(74) *Attorney, Agent, or Firm* — Oliff & Berridge, PLC

(57) ABSTRACT

An input position setting method of setting an input position for an instruction position by an instruction section on the basis of a pickup image data obtained by picking up an image of a display area when an operator instructs a predetermined position of the display area to be displayed by an image display device by the use of the instruction section, includes acquiring an image area corresponding to the instruction section as an instruction image area from the pickup image data; detecting a position existing on a contour of the instruction image area, which is remotest from a reference position set in the instruction image area, as a remotest point and setting the input position on the basis of the remotest point; and generating input position setting progress information to show the operator the progress of setting the input position and superimposing the input position setting progress information on the image data to be displayed by the image display device.

10 Claims, 11 Drawing Sheets

INPUT POSITION SETTING METHOD, INPUT POSITION SETTING DEVICE, INPUT POSITION SETTING PROGRAM, AND INFORMATION INPUT SYSTEM

BACKGROUND

1. Technical Field

The present invention relates to an input position setting method, an input position setting device, an input position setting program and an information input system, by which a position input by an operator can be set on a display area.

2. Related Art

In a graphical user interface of information devices, an acquisition of position information instructed by an operator is very important. In order to achieve such a purpose, for example, an exclusive input section such as a mouse and a tablet is generally used. The exclusive input section includes a data glove and the like. However, such an input section may limit a using environment thereof.

For example, the mouse, the tablet, or the like requires a place for its installation and operation. In addition, the correspondence between the movement and the input position information is indirect. That is, it is necessary to move the mouse or the input pen on a different place while looking up a pointer or the like displayed on the image. In addition, it is necessary to mount the data glove for every input and further the correspondence between the operation and the input position information is indirect as in the mouse and tablet.

Similar to the input section, when the correspondence between the input position information and the operation is indirect, it is necessary to be skilled in inputting the position information. Accordingly, it is difficult to apply such an input section to an information device used by unspecified individuals.

In comparison, a touch panel has a directive correspondence between input position information and an operation. The operation of the touch panel is intuitive and, for example, the touch panel can be widely used in ticket-vending machines for transport facilities and dispense and payment systems for banking facilities, which are used by the unspecified individuals.

However, the touch panel requires a panel having the same size as the input range. When a large input range is required, the production itself of the touch panel having the corresponding size may be difficult and causes extremely high cost.

In order to solve the problems, there is disclosed a technique for acquiring input position information by recognizing an operator's hand or the like on the basis of the pickup image data obtained by picking up an image above a display area which is displayed with an image display device, and detecting the position input by the operator on the basis of the recognition result (for example, see JP-A-9-102046 and JP-A-2000-331170).

The technique disclosed in JP-A-9-102046 discriminates the hand part from the Input images by the use of the features of the hand, thereby recognizing a direction and a form of the hand. In addition, the technique disclosed in JP-A-2000-331170 selects the optimum image by using a plurality of cameras and estimates the motion of the hand, thereby more precisely recognizing the direction and the form of the hand.

The techniques disclosed in JP-A-9-102046 and JP-A-2000-331170 are convenient in that the exclusive input section specially prepared such as a mouse, a tablet, and a data glove is not required. Therefore, these techniques solve some of the above-described problems occurring in the past. However, the techniques still have some common problems.

One problem is that mis-recognition in the recognition process or recognizing the hand is inevitable. It is a general problem in the recognition technologies that the high recognition rate can be obtained in a specially prepared environment such as a laboratory, but the recognition rate decreases in the actual using environment due to various disturbances.

Another problem is that there has not been made the consideration for allowing the operator to understand reasons for the mis-recognition. When the operator well understands a configuration of the system, a reason for a malfunction of the system is often understood at once. However, when the operator is one of the unspecified individuals, it may be not possible for the operator to understand the reason. Accordingly, the system giving an operation not intended by the operator becomes extremely difficult to be used.

In addition, in the techniques disclosed in JP-A-9-102046 and JP-A-2000-331170, there has not been considered at all a case where a plurality of operators use such a kind of information input systems at the same time. This is a principal reason for the malfunction under an actual using environment. That is, when a plurality of operators try to use the information input system at the same time which is only supposed for one operator to use at one time, the system cannot appropriately recognize the instruction operation performed by the plurality of operators, and thus the possibility of malfunction is high.

However, in many cases, the unspecified individuals do not understand that the system has such a limit, so that they can not understand the reason for the not normally operated system.

In addition, for example, a recognition device for recognizing the hand recognizes the hand part according to a color or a form. When there is a material having the same form or color as the hand, the device may mis-recognize the material as the hand. However, the unspecified individuals do not possibly understand such an algorithm and cannot understand why the system does such an erroneous operation.

SUMMARY

An advantage of some aspects of the invention is that it provides an input position setting method, an input position setting device, an input position setting program, and an information input system, which allow an operator to appropriately set the input position for an instruction operation by the operator without using an exclusive input section specially prepared, and exhibit an excellent operability by making a visual display so as for the operator to understand how the information input system sets the input position for the instruction operation by the operator.

According to a first aspect of the invention, the input position setting method of setting an input position for an instruction position by an instruction section on the basis of a pickup image data obtained by picking up an image of a display area when an operator instructs a predetermined position of the display area to be displayed by an image display device by the use of the instruction section, includes acquiring an image area corresponding to the instruction section as an instruction image area from the pickup image data; detecting a position existing on a contour of the instruction image area, which is remotest from a reference position set in the instruction image area, as a remotest point and setting the input position on the basis of the remotest point; and generating input position setting progress information to show the operator the progress of setting the input position and superimposing the input position setting progress information on the image data to be displayed by the image display device.

According to the input position setting method of the aspect of the invention, the input position for the instruction operation by the operator can be appropriately set without applying a specially prepared exclusive input section. In addition, in the invention, the progress of setting the input position is displayed by generating the input position setting progress information to show the operator and superimposing the input position setting progress information on the image data to be displayed by the image display device. Accordingly, the operator sees the display and is able to visually recognize the progress of setting the input position for the instruction operation by himself such as how the information input system sets one position as the input position. Therefore, even when the information input system sets the position not intended by the operator as the input position, the operator can easily understand the reasons of the malfunction of the information input system.

In addition, in the invention, since the image area corresponding to the instruction section (operator's finger or instruction stylus) is detected as the instruction image area from the pickup image data, it is possible to set every input position for the instruction mage areas corresponding to each of the instruction section. Accordingly, a plurality of operators can perform instruction operations on the same display area.

According to a second aspect of the invention, the input position setting method may further include: acquiring a differential image between the display image data to be displayed by the image display device and the pickup image data obtained by picking up an image of the display area; and determining whether or not the differential image contacting the outer circumference of the display area exists by scanning the outer circumference of the display area and taking the differential image as the instruction image area when the differential image contacting the outer circumference of the display area exists.

Accordingly, since the acquiring of an image area includes the second aspect of the invention, the image area corresponding to the instruction section can be appropriately detected as the instruction image area. As a result, it is possible to prevent materials other than instruction section which are put on the display area from being detected as the instruct ion area.

According to a third aspect of the invention, in the Input position setting method, the acquiring of an image area may further include: acquiring the differential image between the display image data to be displayed by the image display device and the pickup image data obtained by picking up the image of the display area; obtaining difference between the differential image at present time and the differential image acquired at predetermined time before the present time among the differential images to acquire a time differential image to be processed from the image area having the difference, and determining whether there is the time differential image to be processed contacting the outer circumference of the display area by scanning the outer circumference of the display area, and taking the time differential image to be processed as the instruction image area corresponding to the instruction section when there is the time differential image to be processed contacting the outer circumference of the display area.

As described above, since the acquiring of an image area includes the third aspect of the invention, the image area corresponding to the instruction section can be appropriately detected as the instruction image area. In addition, since the input position setting method includes a process of detecting the time difference of the differential image, materials existing on the outer circumference of the display area are excluded as long as those do not have positional changes, that is, movements. Accordingly, even when materials other than the instruction section exist on the outer circumference of the display area, those are not determined as the instruction image area corresponding to the instruction section.

When the operator performs instruction operations with the use of instruction section (hand or instruction stylus), it is thought that such instruction section have positional changes, that is, movements. The time differential image to be processed is acquired from the differential image having such positional changes, that is, movements and it is determined whether or not the acquired time differential image to be processed is the instruction image area. Accordingly, only the image area corresponding to the instruction section is detected as the instruction image area, thereby preventing the materials other than instruction section which are put on the display area from being detected as the instruction image area.

According to a fourth aspect of the invention, in the input position setting method, the detecting of a position may include obtaining a centroid of the instruction image area and the obtained centroid may be set as the reference position to obtain the remotest point.

Therefore, the remotest point of the instruction image area corresponding to the instruction section can be appropriately obtained. For example, when the instruction section is the operator's hand, the tip of the finger is appropriately obtained, and when the instruction section is the instruction stylus, the tip of the instruction stylus is appropriately obtained. Accordingly, since the tip of the instruction section is appropriately obtained, the input position can be set to an appropriate position.

According to a fifth aspect of the invention, in the input position setting method, the remotest point may be determined by excluding points existing near the outer circumference of the display area contacting the instruction image area.

As described above, for obtaining the remotest point from the centroid as the reference position, the instruction image area nearby the outer circumference of the display area is excluded so that the tip of the instruction section, for example, the operator's finger or the like, is set as the remotest point.

According to a sixth aspect of the invention, in the input position setting method, when the remotest point is not specified for obtaining the remotest point by taking the centroid as the reference position, the remotest point may be obtained from the outer circumference of the display area contacting the instruction image area.

That is to respond to the case where the remotest point is hardly specified for obtaining the remotest point by taking the centroid as the reference position (for example, a case where a plurality of candidates which can be the remotest point exist). In such a case, there is more possibility to easily and appropriately specify the remotest point by obtaining the remotest point from the outer circumference of the display area contacting the instruction image area.

According to a seventh aspect of the invention, in the input position setting method, the input position setting progress information may include at least one of information representing the reference position, information representing the input position, and information representing a correspondence between the reference position information and the input position information.

Therefore, by displaying the information representing the reference position, the information representing the input position, and the information representing the correspondence between the reference position information and the input position information, the operator sees the display and is able to visually recognize how the information input system sets one position as the input position for the instruction operation by himself. Examples of the information representing the correspondence relationship between the information representing the reference position and the information representing the input position include an arrow which connects the reference position and the input position.

According to an eighth aspect of the invention, in the input position setting method, when the input position set on the basis of the remotest point is outside the display area, the remotest point may be reset so that the input position is inside the display area.

Therefore, a problem that the input position is set outside the display area can be prevented.

According to a ninth aspect of the invention, the input position setting device for setting an input position for an instruction position by instruction section on the basis of a pickup image data obtained by picking up an image of a display area when an operator instructs a predetermined position of the display area to be displayed by an image display device by the use of the instruction section, includes an instruction image area acquiring unit for acquiring an image area corresponding to the instruction section as an instruction image area from the pickup image data; an input position setting unit for detecting a position existing on a contour of the instruction image area, which is remotest from a reference position set in the instruction image area, as a remotest point and setting the input position on the basis of the remotest point; and an information display control unit for input position setting progress or generating input position setting progress information to show the operator the progress of setting the input position and superimposing the input position setting progress information on the image data to be displayed by the image display device.

The same effect as the input position setting method can be obtained by the input position setting device of the aspect of the invention. The input position setting device may include the same characteristics as the input position setting method.

According to a tenth aspect of the invention, the input position setting program for setting an input position for an instruction position by an instruction section on the basis of a pickup image data obtained by picking up an image of a display area when an operator instructs a predetermined position of the display area to be displayed by an image display device by the use of the instruction section, includes: acquiring the image area corresponding to the instruction section as an instruction image area from the pickup image data; detecting a position existing on a contour of the instruction image area which is remotest from a reference position set in the instruction image area as a remotest point and setting the input position on the basis of the remotest point; and generating input position setting progress information to show the operator the progress of setting the input position and superimposing the input position setting progress information on the image data to be displayed by the image display device.

The same effect as the input position setting method can be obtained by the input position setting program of the aspect of the invention. The input position setting program may include the same characteristics as the input position setting method.

According to an eleventh aspect of the invention, the information input system includes an image display device, an image pickup device picking up an image of a display area displayed by the image display device, and an input position setting device setting an input position or an instruction position by an instruction section on the basis of a pickup image data when an operator instructs a predetermined position of the display area by the use of the instruction section, wherein the input position setting device includes: an instruction image area acquiring unit for acquiring the image area corresponding to the instruction section as an instruction image area from the pickup image data; an input position setting unit for detecting a position existing on a contour of the instruction image area, which is remotest from a reference position set in the instruction image area, as a remotest point and setting the input position on the basis of the remotest point; and an information display control unit for input position setting progress for generating input position setting progress information to show the operator the progress of setting the input position and superimposing the input position setting progress information on the image data to be displayed by the image display device.

The same effect as the input position setting method can be obtained by the information input system of the aspect of the invention, and the information input system can be employed as an information input system which an be easily used by the operator. Particularly, the input position setting progress information is generated and superimposed on the image data to be displayed by the image display device so as to display the input position setting progress information. Accordingly, the operator sees the display and is able to visually recognize the progress of setting the input position for the instruction operation by himself, that is, how the information input system sets one position as the input position. An operator not familiar with such information input system can also easily use the information input system. In addition, the information input system of the aspect of the invention allows a plurality of operators to perform instruction operations on the same display area.

The information input system may include the same characteristics as the input position setting method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described.

First Embodiment

Figure 1:
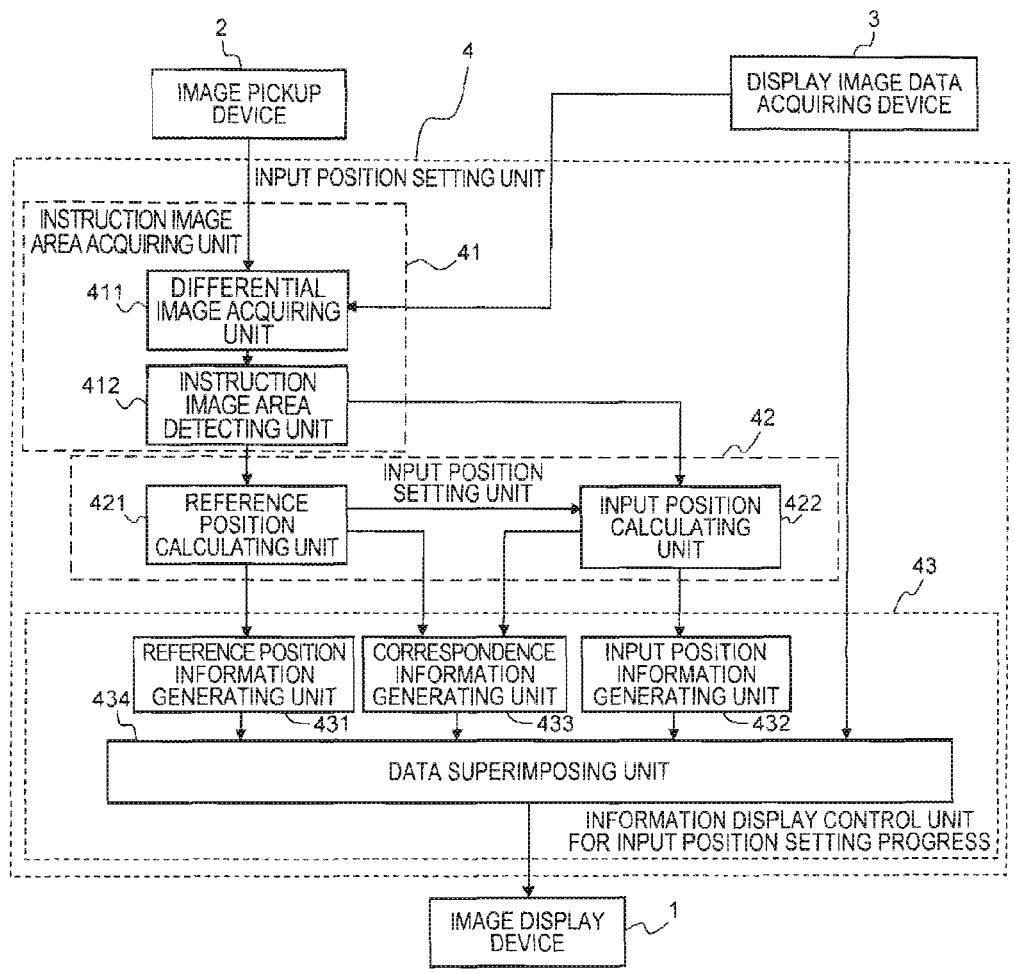
FIG. 1 shows a configuration of an information input system according to a first embodiment.

FIG. 1 shows a configuration of an information input system according to a first embodiment. As shown in FIG. 1, the information input system according to the first embodiment includes an image display device 1 such as a projector; an image pickup device 2 for picking up an image of a display area displayed by the image display device 1; a display image data acquiring device 3 (personal computer or the like which acquires image data for the image to be displayed by the image display device 1; and an input position setting device 4 for setting the input position for the instruction position instructed by an operator with use of an instruction section (operator's hand or an instruction stylus or the like) based on the pickup image data output by the image pickup device 2.

The input position setting device 4 includes an instruction image area acquiring unit 41 which detects and outputs the image corresponding to the instruction section as an instruction image area based on the pickup image data from the image pickup device 2; an input position setting unit 42 which detects a position existing on a contour of the instruction image area which is remotest from a reference position (centroid of the instruction image area), set within the instruction image area as a remotest point, and sets the input position of the operator on the basis of the detected remotest point; and an information display control unit for input position setting progress 43 which generates input position setting progress information to show the operator the progress of setting the input position, and superimposes the input position setting progress information onto the image data to be displayed by the image display device 1.

The instruction image area acquiring unit 41 includes a differential image acquiring unit 411 which detects and binarizes the difference (differential image) between the pickup image data from the image pickup device 2 and the display image data (image data to be displayed by the image display device at present time) given for the image display device 1 from the display image data acquiring device 3; and an instruction image area detecting unit 412 which detects the image area to be processed, that is, the instruction image area corresponding to the instruction section, on the basis of the binarized differential image.

The input position setting unit 42 includes a reference position calculating unit 421 which calculates the centroid of the instruction image area detected by the instruction image area detecting unit 412 as the reference position; and an input position calculating unit 422 which detects a point on the contour of the instruction image area which is remotest from the reference position set in the instruction image area as the remotest point, and calculates the input position of the operator based on the detected remotest point.

The information display control unit for input position setting progress 43 includes a reference position information generating unit 431 which generates visual information (reference position information) to show the operator the reference position calculated by the reference position calculating unit 421; an input position information generating unit 432 which generates visual information (input position information) to show the operator the input position calculated by the input position calculating unit 422; a correspondence information generating unit 433 which generates visual information (corresponding information) to show the operator a correspondence relationship between the reference position information and the input position; and a data superimposing unit 434 which superimposes these reference position information, input position information, and corresponding information onto the image data to be displayed by the image display device 1.

Figure 2:
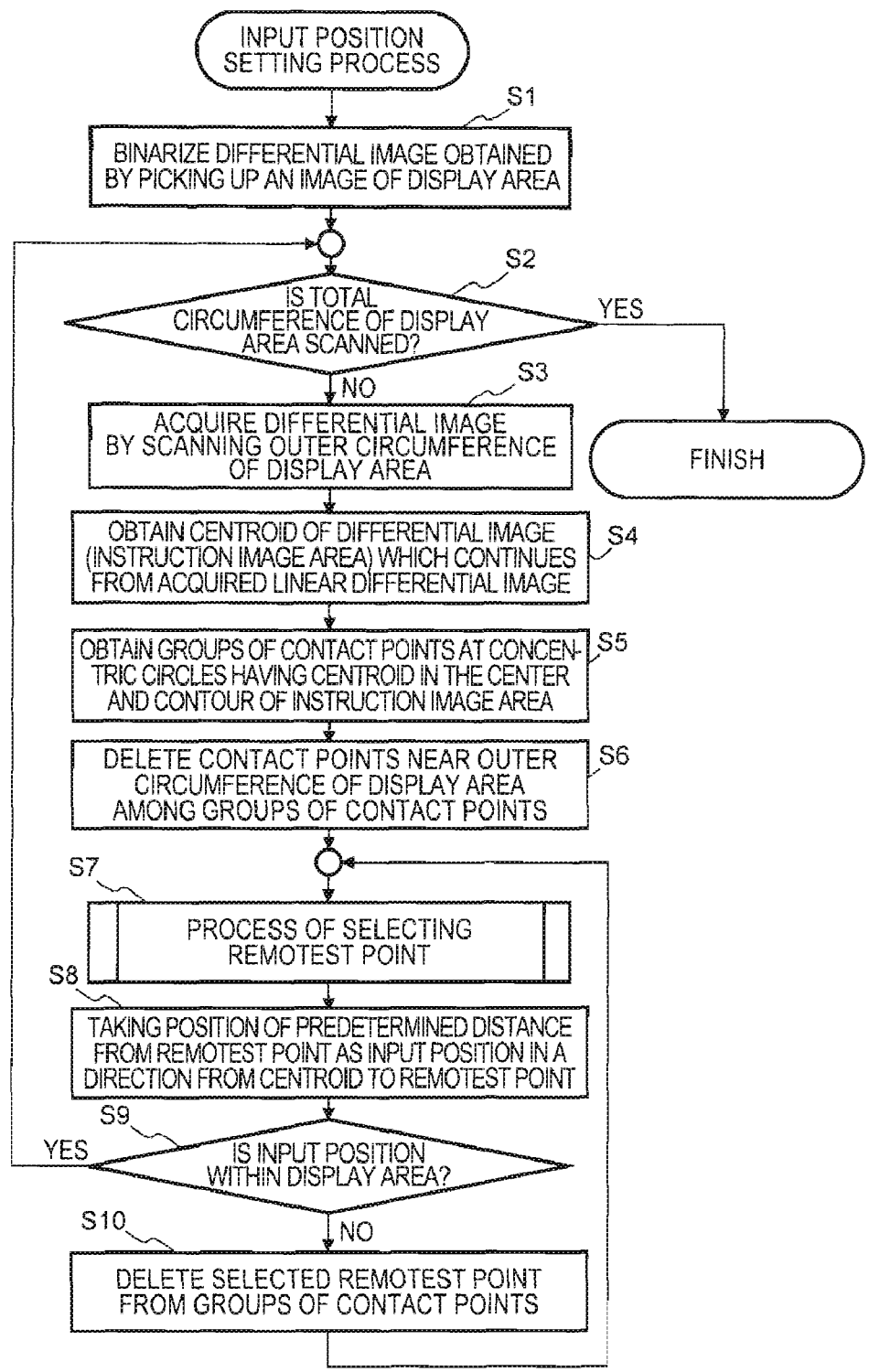
FIG. 2 shows a flowchart illustrating an input position setting process procedure in the information input system according to the first embodiment.

FIG. 2 shows a flowchart illustrating an input position setting process procedure in the information input system according to the first embodiment. Hereinafter, the input position setting process procedure will be descried with reference to FIGS. 3 and 4 in addition to the flowchart in the FIG. 2.

In FIG. 2, first, the differential image is acquired on the basis of the pickup image data obtained by picking up the image of the display area and the differential image is binarized (step S1). In the process of step S1, the image pickup device 2 picks up the image of the display area displayed by the image display device 1 and the differential image acquiring unit 411 acquires the differential image between the pickup image data, thus obtained and the display image data given for the image display device 1 from the display image data acquiring unit 3.

Figure 3A:
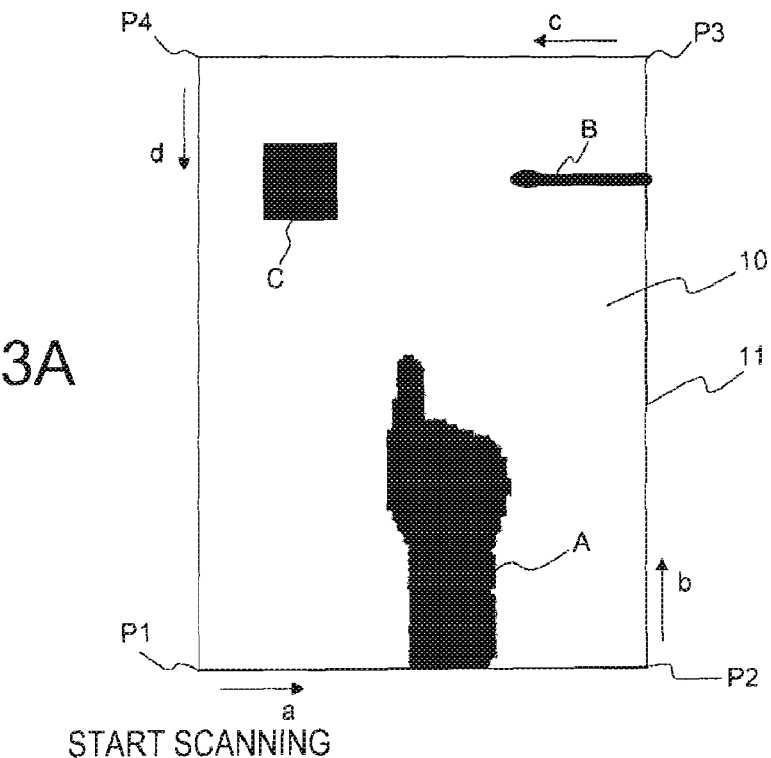
FIGS. 3A and 3B show an example of binarizing a differential image.
Figure 3B:
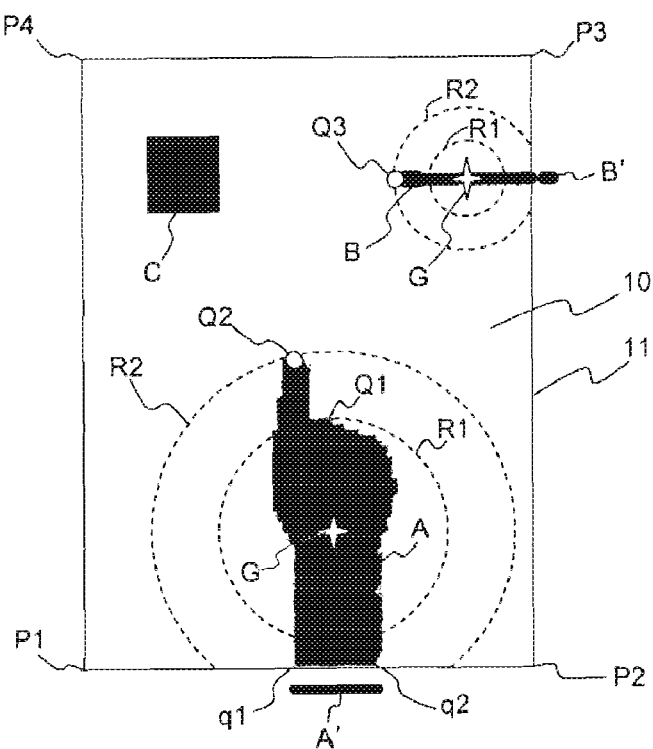

FIGS. 3A and 3B show an example of binarizing the differential image. In FIGS. 3A and 3B, a quadrangular frame 11 shows an outer circumference (hereinafter, referred to as an outer circumference 11) of the display area 10 displayed by the image display device 1. In FIG. 3A, there are shown binarized differential images A, B, and C which correspond to three materials existing within the display area 10.

In FIGS. 3A and 3B, the differential image A is the binarized image which corresponds to a state where one operator (first operator) extends his hand on the display area 10 so as to instruct a predetermined position on the display area 10 displayed by the image display device 1 with the tip of his hand. The differential image B is the binarized image which corresponds to a state where another operator (second operator) different from the first operator extends the instruction stylus on the display area 10 so as to instruct a predetermined position on the display area 10 with the instruction stylus as an instruction section. The differential image C is the binarized image which corresponds to one material other than the instruction section put within the display area 10.

Returning back to the description of FIG. 2, after the differential images are binarized by step S1, it is determined whether or not the total circumference of the display area 10 is scanned (step S2). When the total circumference of the display area 10 is not scanned, the outer circumference 11 of the display area 10 which is not scanned is scanned and the process of acquiring the differential image on a part contacting the outer circumference 11 is performed (step S3).

In FIG. 3A, the total circumference of the display area 10 is scanned, for example, by first scanning from a position P1 of the outer circumference 11 of the display area 10, that is, a scanning starting point, to a position P2 in a rightward direction (arrowed a direction) along the outer circumference 11, from the position P2 to a position P3 in an upward direction (arrowed b direction) along the outer circumference 11, from the position P3 to a position P4 in a leftward direction (arrowed c direction) along the outer circumference 11, and from the position P4 to a position P1 in a downward direction (arrowed d direction) along the outer circumference 11.

When the outer circumference 11 of the display area 10 is scanned, the differential image on the part contacting the outer circumference 11, that is, a linear differential image corresponding to the outer circumference 11 is acquired. For example, as shown in FIG. 3B, when outer circumference 11 is scanned from the position P1 to the position P2 in the arrowed a direction, the linear differential image A' corresponding to the outer circumference 11 is acquired.

Returning back to the description of FIG. 2, when the linear differential image is acquired by scanning along the outer circumference 11 of the display area 10, a centroid of the differential image which continues from the acquired linear differential image (in this case, the differential image which continues from the differential image A') is obtained (step S4).

For example, in the case of the linear differential image A', term 'the differential image which continues from the acquired linear differential image' means that the differential image which continues from the differential image A' is the total area of the binarized differential image A in FIGS. 3A and 3B.

Accordingly, when the linear differential image is acquired by scanning along the outer circumference 11 of the display area 10, the linear differential image can be determined as a part of the image area corresponding to the instruction section (hand or instruction stylus) at the time of the operator's instruction with the instruction section. Here, when the linear differential image corresponding to the outer circumference 11 is acquired, the differential image which continues to the linear differential image can be determined as the image area corresponding to the instruction section. Thus, the differential image which continues to the linear differential image is referred to as 'an instruction image area'.

As described above, when the instruction image area (instruction image area A) corresponding to the differential image A' is acquired by scanning along the outer circumference 11 of the display area 10 from the position P1 in the arrowed a direction, the centroid G of the instruction image area A is obtained and the obtained centroid G becomes the reference position. A method of obtaining the centroid G is not particularly limited and the centroid can be obtained by various methods.

The centroid G obtained in the instruction image area A is shown in FIG. 3B. The white cross mark shown in FIG. 3B represents the centroid G as the reference position obtained in the instruction image area A. The white cross mark representing the centroid G is generated by the reference position information generating unit 431, superimposed on the image data to be displayed by the image display device 1, and displayed by the image display device 1.

Turning back to the description of FIG. 2, when the centroid G of the instruction image area A is obtained by step S4, points (groups of contact points) at which the concentric circles contact the contour of the instruction image area are obtained in consideration of several concentric circles having the centroid G in the center (step S5). The points where the concentric circles contact the contour of the contour of the instruction image area are not intersecting the points (intersecting point) of the concentric circles and the contour of the instruction image area, and are just the contacting points (contact point).

The process of the step S5 is described with reference to FIG. 3B. FIG. 3B shows a case where two concentric circles R1 and R2 are considered. In this case, in the instruction image area A, for example, Q1 is acquired as the contact point of the concentric circle R1 and the contour of the instruction image area A. In addition, for example, Q2 is acquired as the contact point of the concentric circle R2 and the contour of the differential image A.

Returning back to the description of FIG. 2, in step S5, when the contact points of the concentric circles and the contour of the instruction image area A are acquired, the contact points nearby the outer circumference 11 of the display area 10 are excluded from the obtained several contact points (step S6). This includes the case where the concentric circle coincidentally passes a part at which the outer circumference 11 of the display area 10 contacts the instruction image area (for example, q1 and q2 in FIG. 3B), and in such case their contact points are excluded. However the concentric circles R1 and R2 and the instruction image area A in FIG. 3B do not have such kinds of contact points.

Next, among the contact points other than the contact points excluded in step S6, a point which is remotest from the centroid G (remotest point) is selected (step S7). The position of a predetermined distance from the remotest point is obtained in a direction from the centroid G to the remotest point, and the obtained position becomes the input position of the operator (step S8). In FIG. 3B, the contact point Q2 acquired as the remotest point is represented by a white circle.

Figure 4:
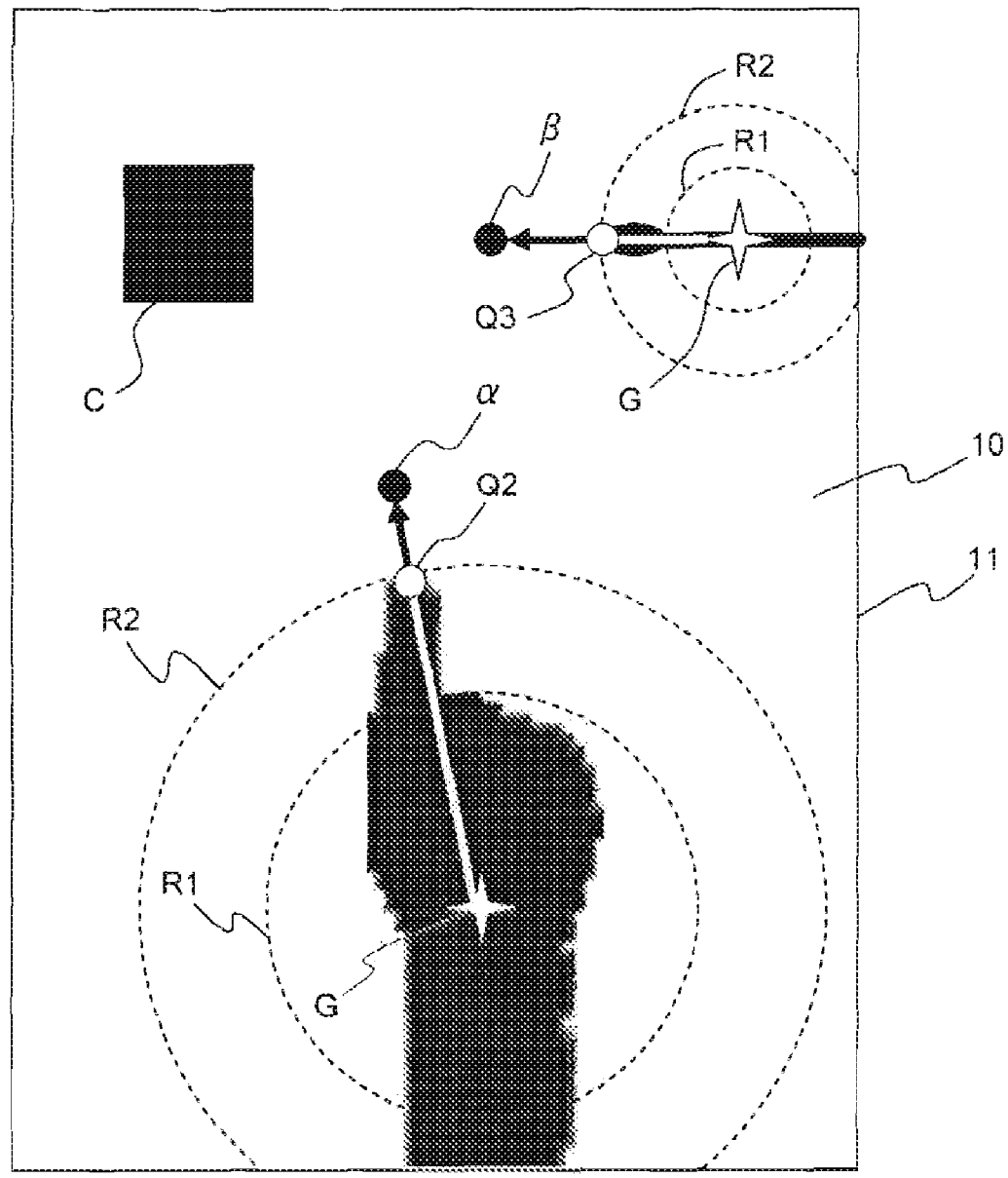
FIG. 4 shows a centroid, a remotest point, an input position and their correspondence relation on the binarized image shown in FIGS. 3A and 3B.

FIG. 4 describes the process of step S8 in detail. In the instruction image area A, the contact point Q2 is selected as the remotest point among the several contact points obtained as described in FIG. 3B. Therefore, as shown in FIG. 4, a position a of the predetermined distance from the contact point Q2 on a line passing through the contact point Q2 which is the remotest point from the centroid G is set, and this position α becomes the input position a of the first operator.

Returning back to the description of FIG. 2, when the input position α of the first operator is obtained by step S8, it is determined that whether or not the obtained input position α is within the display area 10. When the position α is not within the display area 10, step S7 is processed again to select the remotest point again and the other contact point which can be the remotest point is reset as the remotest point and step S8 is processed.

When it is determined that the obtained input position α is within the display area 10, the process of step S2 is performed again and the outer circumference which is not yet scanned is scanned.

When the input position a of the first operator is obtained, the input position information representing the input position is displayed (black circle in FIG. 4). The input position information representing the input position is generated by the input position information generating unit 432, superimposed on the image data to be displayed by the image display device 1, and displayed by the image display device 1.

As correspondence information representing the correspondence relationship between the reference position information (white cross mark) and the input position information (black circle), for example, a line (arrow) extending from the reference position to the remotest point to connect the input position is displayed as shown in FIG. 4. The correspondence information is generated by the correspondence information generating unit 433, superimposed on the image data to be displayed by the image display device 1, and displayed by the image display device 1.

As described above, the representations of the reference position information (white cross mark) and the input position information (black circle) are displayed in addition to the correspondence information (arrow) representing the correspondence relationship between them. Accordingly, the operator can visually recognize the progress of setting the input position for the instruction operation by himself, that is, how the information input system sets one position as the input position. Therefore, even when, for example, the information input system sets the position riot intended by the operator as the input position, the operator can easily understand the reasons of the malfunction of the information input system.

Figure 5:
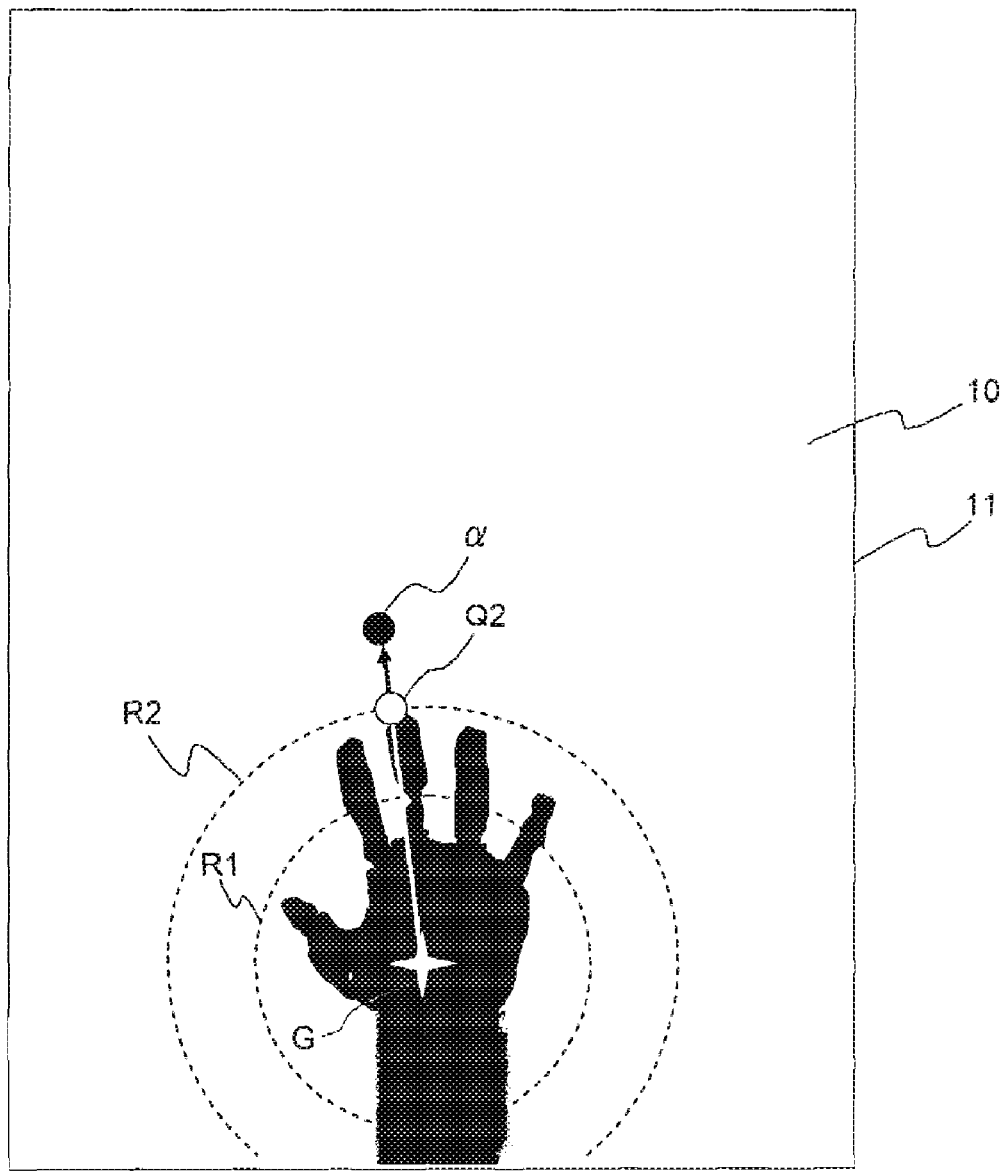
FIG. 5 shows a case where an operator can hardly understand which position an information system sets as an input point.

FIG. 5 shows a case where the operator can hardly understand which position the information system sets as the input point. In the examples of FIGS. 3 and 4, the operator can intuitively understand which position the information system sets as the input point. However, as shown in FIG. 5, when the operator extends his hand within the display area 10 with his fingers open, it is difficult for the operator to intuitively understand where the input position set by the information input system is.

In this case, as shown in FIG. 5, the representations of the reference position information (white cross mark) and the input position information (black circle) are also displayed in addition to the correspondence information (arrow) representing the correspondence relationship between them. Accordingly, the operator can easily understand how the information input system sets the input position for the instruction operation by himself.

The information representing the remotest point may be displayed as well as the representations of the reference position information and the input position information, and their correspondence information.

Hereinabove, the process of the instruction image area A has been described. When it is determined in step S2 that there is the outer circumference not finished with scanning, the outer circumference 11 of the display area 10 is scanned again to acquire the next differential image. For example, when the outer circumference is scanned from the position P2 to the position P3 in the arrowed b direction in FIG. 3A, the linear differential image B' contacting the outer circumference 11 is acquired as shown in FIG. 3B. The differential image which continues from the linear differential image B' thus obtained is acquired as the instruction image area (instruction image area B) and the centroid G of this instruction image area B is obtained.

Next, the same process as the instruction image area A are performed. That is, in consideration of concentric circles R1 and R2 having the centroid G in the center as the reference position in the instruction image area B, for example, Q3 is acquired as the contact point of the concentric circle R2 and the contour of the instruction image area B, that is, the remotest point. As shown in FIG. 4, a position β of a predetermined distance from the contact point Q3 on a line passing through the contact point Q3 (represented by a white circle in FIG. 4) which is the remotest point from the centroid G as the reference position is set and this position β becomes the input position β of the operator (second operator).

When the input position β is within the display area 10, the outer circumference 11 of the display area 10 is continuously scanned and the next differential image is acquired. That is, when the outer circumference is scanned from the position P3 to the position P4 in the arrowed b direction, and scanned from the position P4 to the position P1 in FIG. 3A, the differential image corresponding to the outer circumference 11 of the display area 10 is not acquired. In addition, when it is determined that the total circumference of the display area is scanned, the process is finished.

Since the differential image C does not include a part contacting the outer circumference, it is excluded from objects for processing and does not include the instruction image area. As described above, in the embodiment of the invention, among the binarized differential images, the differential image of which the contour contacts the outer circumference 11 of the display area 10 can be the image area corresponding to the instruction section, that is, the instruction image area.

Figure 6:
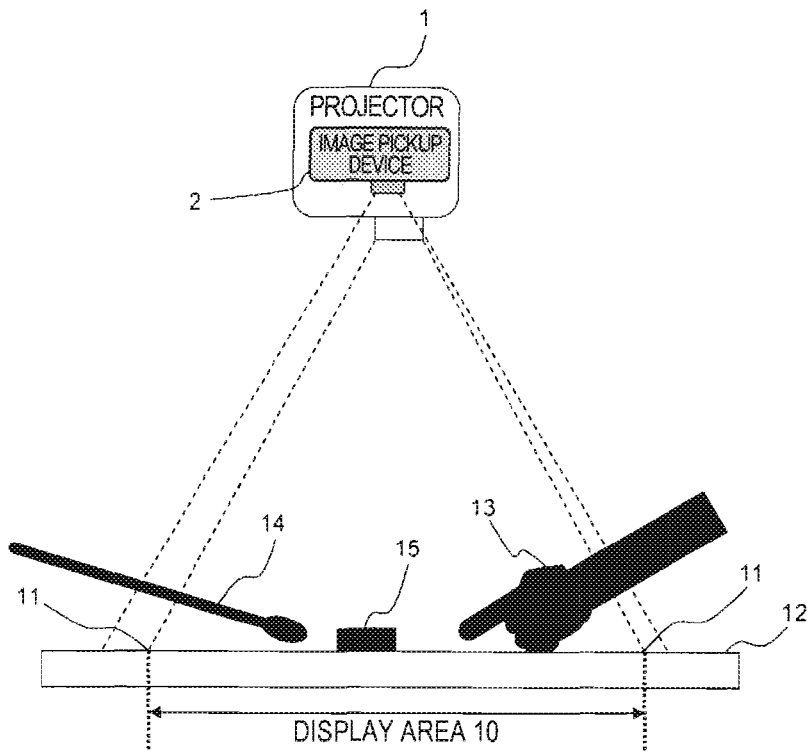
FIG. 6 shows examples of an image acquired as an instruction image area and an image not acquired as an instruction image area.

FIG. 6 shows examples of an image acquired as the instruction image area and an image not acquired as the instruction image area. As shown in FIG. 5, in the information input system in which an image is projected on a desk plane 12 from, a projector as the image display device 1, the image pickup device 2 picks up the image thus projected, and input position information of the operator is obtained from the pickup image data, when the first operator extends his hand 13 to the desk plane 12 and the second operator extends the instruction stylus 14 to the desk plane 12, a part of the hand 13 or the instruction stylus 14 contacts the outer circumference 11 of the display area 10. Thus, it is acquired as the instruction image area. However, since the material 15 put within the display area 10 does not contact the outer circumference 11 of the display area 10, it is excluded from objects for processing and not acquired as the instruction image area.

In step S8 for processing the predetermined distance from the remotest point as the input position, 'the predetermined distance from the remotest point' at the time of setting the input position is, for example, the distance on which the pointer is displayed on an appropriate position of a tip of the instruction section as viewed from the operator at the time of displaying the pointer or the like on the input position. Specifically, for example, when the operator moves the pointer to draw a line while moving the tip of his finger, it is preferable to give the operator the feeling of integrally moving the tip of the operator's finger and the pointer. Therefore, in consideration of such a matter, it is preferable to set 'the predetermined distance from the remotest point'.

Figure 7:
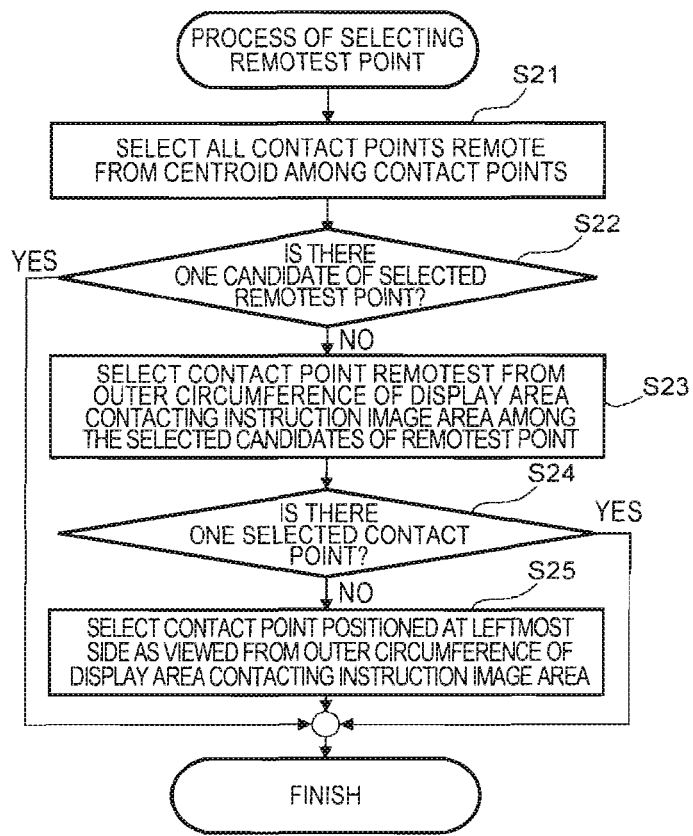
FIG. 7 is a flowchart illustrating a process of step S7 (remotest point selecting process) of the flowchart in FIG. 2 in detail.

FIG. 7 is a flowchart illustrating a process of step S7 (remotest point selecting process) in the flowchart of FIG. 2 in detail. In FIG. 7, among the groups of the contact points, all of the contact points remote from the centroid, that is, the contact points which can be the remotest points (candidates of remotest points) are selected (step S21). Then, it is determined whether or not the number of the selected candidates of the remotest points is one (step S22). When it is determined that the number of the candidates is one, the selected candidate of the remotest point can be determined as the remotest point to be obtained. Thus, the process is finished.

On the contrary, when the number of the selected candidate of the remotest points is not one, among the selected candidates of the remotest points, the contact point remotest from the outer circumference 11 of the display area 10 contacting the instruction image area is selected as the remotest point to be obtained (step S23). Here, it is determined whether or not the number of contact points selected by step S23 is one (step S24). When it is determined that the number of the contact points is one, the selected contact point (the contact point remotest from the outer circumference 11 of the display area 10) can be determined as the remotest point to be obtained. Thus, the process is finished.

When the number of the contact points selected in step S24 is not one, among the selected contact points, the contact point positioned at leftmost side as viewed from the outer circumference 11 of the display area 10 contacting the instruction image area is selected as the remotest point to be obtained (step S25). The process of step S35 is performed because, for example, when the operator is a right hander, the operator often instructs using an index finger of his right hand.

As described above, according to the first embodiment, the input position for the instruction operation by the operator can be appropriately set. In addition, there is displayed the information which allows the operator to understand how the information input system sets the input position for the instruction operation by the operator, that is, the input position setting progress.

Accordingly, since the operator sees the display of the input position setting progress information, the operator can visually recognize the progress of setting the input position for the instruction operations by himself, that is, how the information input system sets one position as the input position. Therefore, even when the information input system, for example, sets the position not intended by the operator as the input position, the operator can easily understand the reason for the malfunction of the information input system.

As shown in FIGS. 3A and 3B, in the embodiment of the invention, since the image area corresponding to the instruction section (operator's finger or instruction stylus) is detected as the instruction image area from the pickup image data, it is possible to set every input position for the instruction image areas corresponding to each of the instruction section. Therefore, a plurality of operators can instruct operations on the same display area.

Second Embodiment

Figure 8:
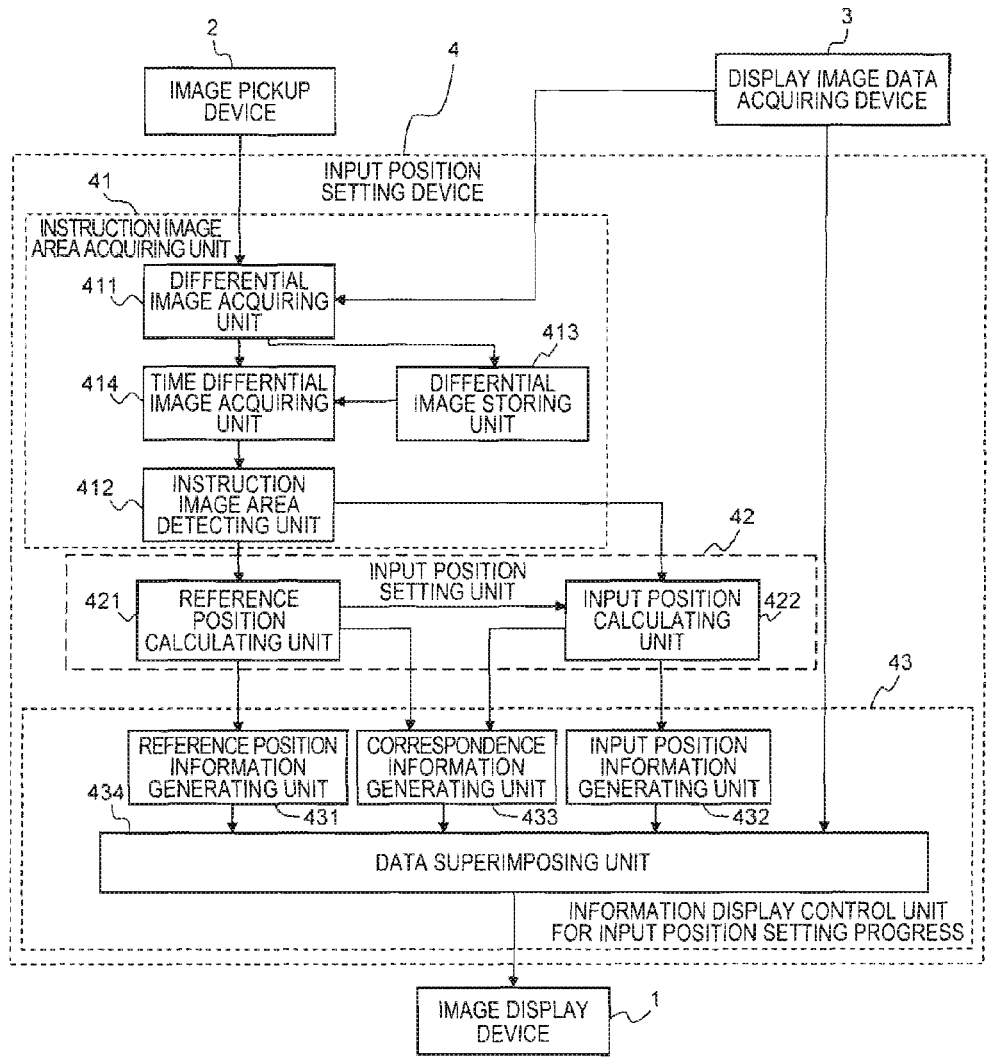
FIG. 8 shows a configuration of an information input system according to a second embodiment.

FIG. 8 shows a configuration of the information input system according to a second embodiment. As shown in FIG. 8, an information input system according to the second embodiment is different from the information input system according to the first embodiment shown in FIG. 1 in that an instruction image area acquiring unit 41 includes a differential image storing unit 413 and a time differential image acquiring unit 414 in addition to the differential image acquiring unit 411 and the instruction image area detecting unit 412. Besides this, the information input system is same as the one in FIG. 1 and the same reference numerals are given to the same parts.

The differential image storing unit 413 stores the differential image (differential image between the pickup image data and the display image data) which is acquired by the differential image acquiring unit 411. That is, among the differential image data between the pickup image data and the display image data of each frame output from the image pickup device 2, the differential image between the pickup image data and the display image data of the frame at least one before the present frame is stored.

The time differential image acquiring unit 414 detects a time difference between the differential image of the pickup image data and the display image data of the present frame, and the differential image before the one stored in the differential image storing unit 413 (for example, one frame before), which are acquired by the differential image acquiring unit 411.

As described in the example of FIG. 8, the information input system according to the second embodiment is different from the information input system according to the first embodiment in that the time difference of the differential images acquired by the differential image acquiring unit 411 is detected. The time difference of the differential images is detected, for example, to correspond to the state described in FIG. 9.

Figure 9:
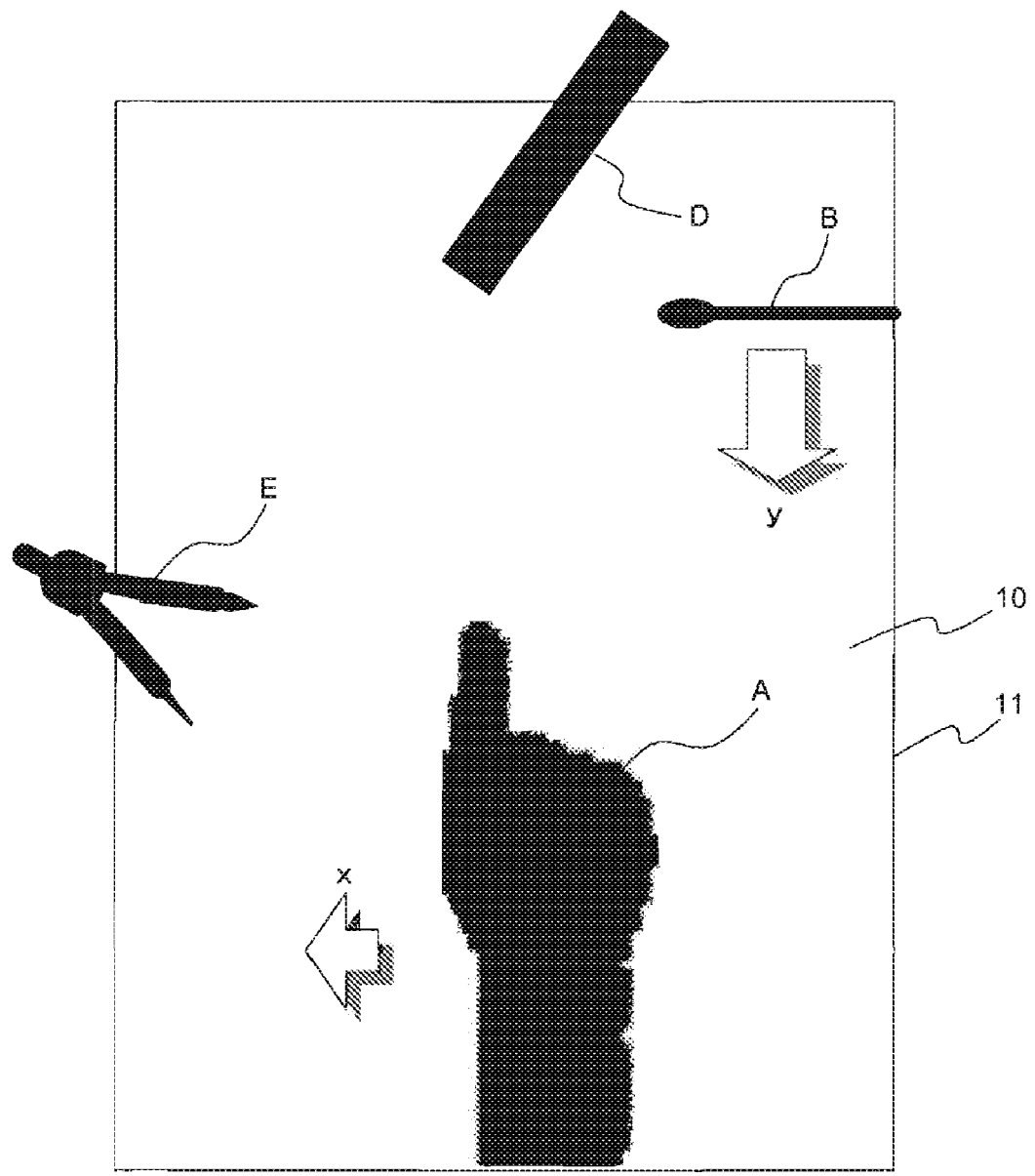
FIG. 9 shows an example which is preferable to detect time difference of a differential image.

FIG. 9 shows an example which is preferable to detect time difference of the differential image. As shown in FIG. 9, when there are any materials other than the instruction section (hand or instruction stylus) on a position intersecting the outer circumference 11 of the display area 10, the information input system of the first embodiment regards the differential image corresponding to the materials other than the instruction section as the instruction image area.

In response to such a case, the information input system of the second embodiment is provided. In FIG. 9, a differential image D is the differential image corresponding to a ruler put on the display area 10 and a differential image E is the differential image corresponding to a compass put on the display area 10 as well. These are not moved and kept in the position as it is. By the instruction operation of the operator, the differential image A is moved in an arrowed x direction and the differential image B is moved in an arrowed y direction.

The information input system of the second embodiment detects an existence of the positional changes, that is, the movements, of the differential image which is acquired by the differential image acquiring unit 411, and sets the differential image only which is changed in position as the image area corresponding to the instruction section, that is, the instruction image area. Hereinafter, the information input system according to the second embodiment will be described in detail.

Figure 10:
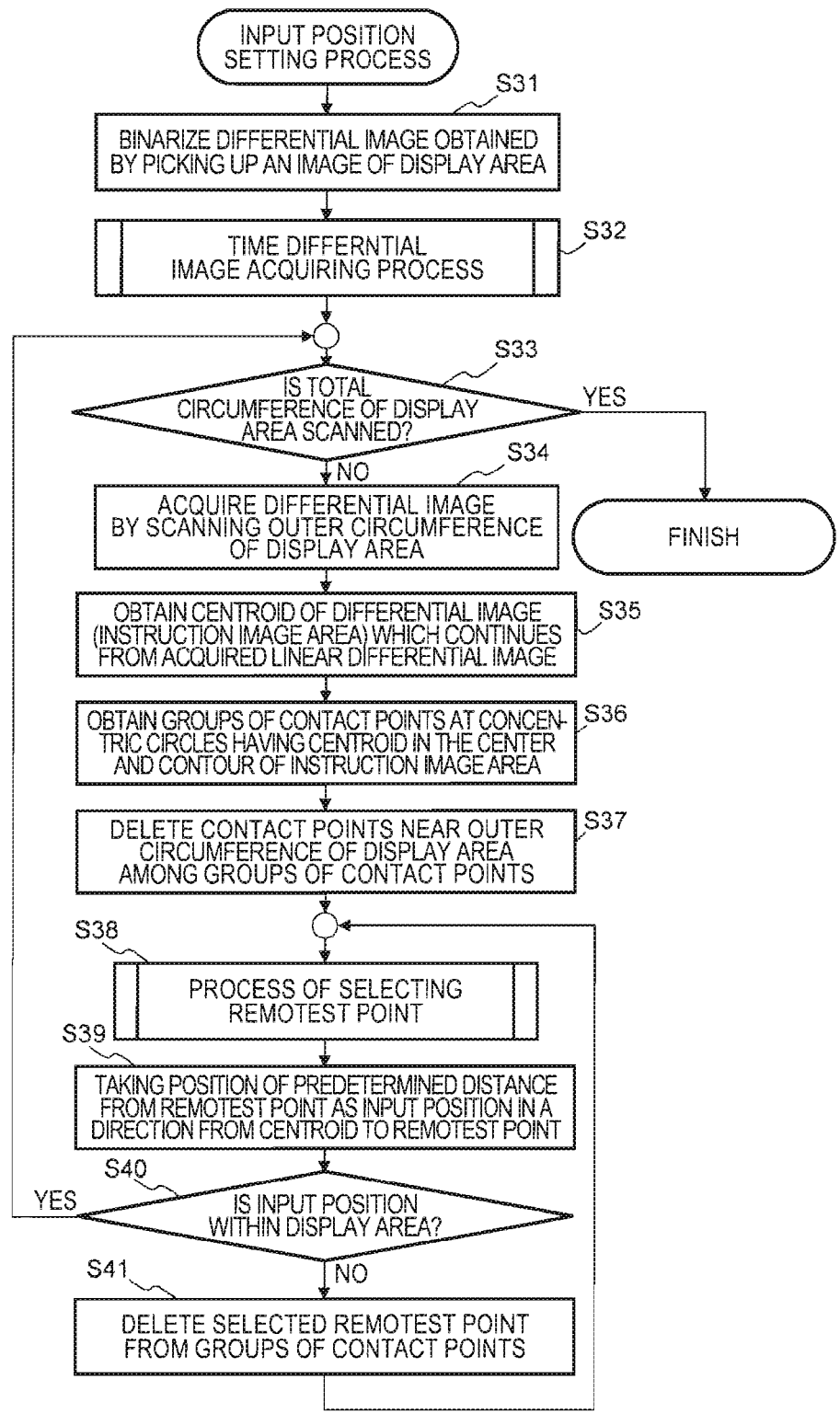
FIG. 10 is a flowchart describing an input position setting process procedure in the information input system according to the second embodiment.

FIG. 10 is a flowchart describing an input position setting process procedure of the information input system according to the second embodiment. Among steps S31 through S41 shown in FIG. 10, step S31 is the same process as step S1 of the flowchart in FIG. 2 used for the description of the first embodiment and the steps S33 through S41 are the same process as steps S2 through S10 of the flowchart in FIG. 2 used for the description of the first embodiment.

That is, FIG. 10 is different from FIG. 2 in that a process of acquiring the time differential image (step S32) is added next to the process of binarizing the differential image (step S31). Therefore, in the second embodiment, the time differential image acquiring process is mainly described.

Figure 11:
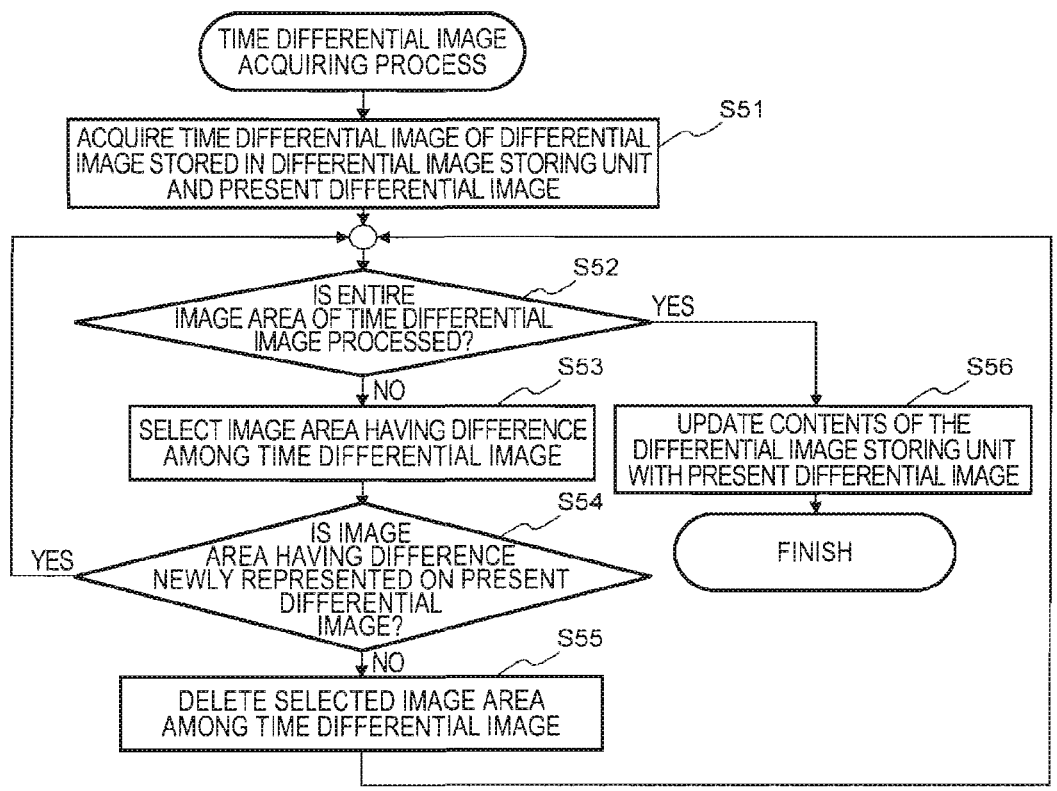
FIG. 11 is a flowchart illustrating a process of acquiring the time differential image of step S32 in FIG. 10.

FIG. 11 is a flowchart illustrating a process of acquiring the time differential image of step S32 in FIG. 10. In FIG. 11, first, the difference between the differential image of the present frame (present differential image) and the differential image stored in the differential image storing unit 413 (differential image of one frame before the present frame) are obtained to provide the time differential image thereof (step s51).

Here, it is determined whether or not entire image areas of the time differential images acquired in step S51 are processed (step S52). When the entire image areas are not processed yet, among the acquired time differential images, one of the image areas having the difference is selected (step S53). The image area having the difference is determined whether or not it is an image area newly represented on the present differential image (step S54). When it is determined that the image area is newly represented, step S52 is processed again.

On the contrary, when it is determined that the image area is not newly represented in step S54, the image area selected in step S53 is deleted (step S55) among the time differential images and step S52 is processed again.

It is determined that whether all processes for the image areas of the time differential images acquired in step S51 are finished (step S52). When all processes for the image areas are finished, the contents of the differential image storing unit 413 are updated with the present differential image (step S16).

By the processes as described in the flowchart of FIG. 1, for example, in the example of FIG. 9, the differential image D or the differential image E which does not have positional changes, that is, movements, is deleted and the differential image A corresponding to the operator's hand and the differential image B corresponding to the instruction stylus are only detected as the time differential image. In addition, among the differential image A and the differential image B, the area which does not exist on the differential image stored in the differential image storing unit 413 (area which is newly represented on the present differential image) is only detected as the time differential image to be processed. This is shown in FIG. 12.

Figure 12:
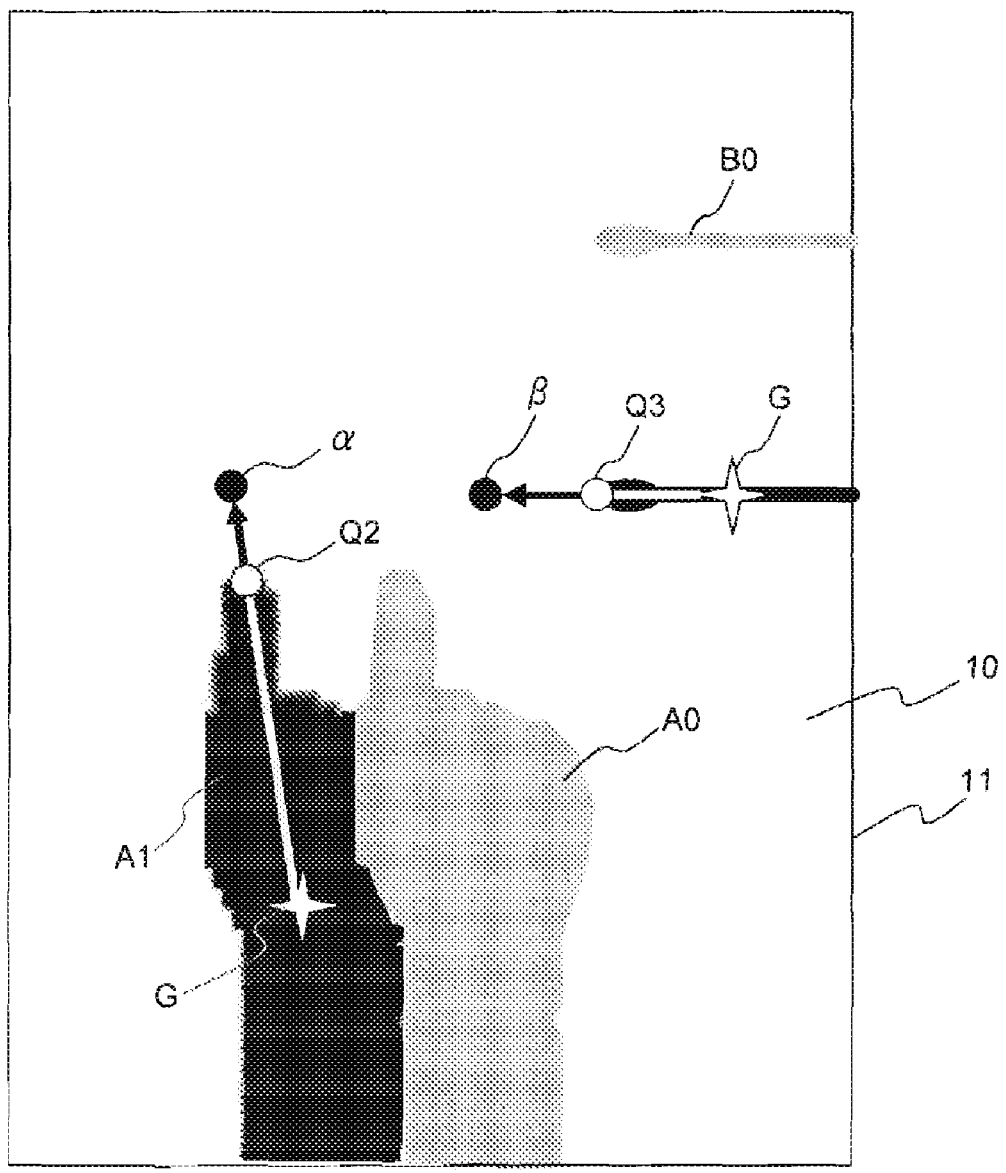
FIG. 12 illustrates a process of acquiring the time differential image.

In FIG. 12, the image areas shown by gray color indicate the differential image A0 corresponding to the hand and the differential image B0 corresponding to the instruction stylus at the time of t0, which are stored in the differential image storing unit 413. As shown in FIG. 9, when the time differential image acquiring unit 414 is input with the present differential images after the hand and the instruction stylus are moved in the arrowed x direction and the arrowed y direction respectively (the present differential image which can be obtained at the time of t1), and the differential images A0 and B0 at the time of t0 stored in the differential image storing unit 413, only the image areas A1 and B1 shown in black color in FIG. 12 can be obtained by the process as described in the flowchart of FIG. 11.

Accordingly, when the image area (newly represented image area) which does not exist on the differential image before this image area (differential image stored in the differential image storing unit 413) is detected as the time differential image, this image area is detected as the time differential image to be processed.

The time differential image to be processed is subjected to a process of determining whether or not the time differential image to be processed is the image area corresponding to the instruction section, that is, the instruction image area (steps S33 and S34 in FIG. 10). When it is determined that it is the instruction image area, a process after the process of obtaining the centroid as the reference position (step S35 in FIG. 11) is performed. That is, for the time differential image to be processed (image area A1 shown in the black color in FIG. 12), the centroid G as the reference position is obtained. Processes after step S33 can be performed as described in the first embodiment and the descriptions thereof will be omitted.

In FIG. 12, the white cross marks indicate the reference positions (centroid G) obtained in time differential images (image areas A and B shown in black color) to be processed and the white circles Q2 and Q3 are the remotest points obtained in time differential images to be processed (image areas A and B shown in black color). The positions α and β represented by black circles set for time differential images to be processed (image areas A and B shown in black color).

As described in the first embodiment, the representations of the reference position information (White cross mark) and the input position information (black circle) are displayed in addition to the correspondence information (arrow) representing the correspondence relationship between them. Also, the representation of the remotest point may be displayed as well as the reference position and the input position.

In addition, there is a possibility that the operator's hand and the instruction stylus may further remove after the time of t1. However, the same processes as described above are performed between the present differential images at the times of t2, t3 and so on and the differential images stored in the differential image storing unit 413. The times t0, t1 and so on may be synchronized with the frame cycles of the pickup image data which can be obtained by the image pickup device 2.

As described above, according to the second embodiment, the time difference of the differential image can be detected thereby preventing the case described in FIG. 9, that is, the case where materials other than instruction section are put on the outer circumference 11 of the display area 10 and processed as the instruction section.

The invention is not limited to the above embodiments and various variations are possible within the scope of the invention. For example, in the above embodiments, the example of employing the projector as the image display device is described, but the image display device is not limited to the projector and may be a direct-view-type display device.

In addition, an input position setting program may be adopted as a program for carrying out input position setting processes described in the embodiments by computer and the adopted input position setting program may be recorded in various recording media. Therefore, the invention also includes the recording media in which the input position setting program is recorded. The input position setting program may be acquired from a network.

The entire disclosure of Japanese Patent Application No. 2006-39031, filed Feb. 16, 2006 is expressly incorporated by reference herein.

What is claimed is:

1. An input position setting method of setting an input position for an instruction position by an instruction section on the basis of a pickup image data obtained by picking up an image of a display area when an operator instructs a predetermined position of the display area to be displayed by an image display device by the use of the instruction section, comprising:
   acquiring an image area corresponding to the instruction section as an instruction image area from the pickup image data;
   detecting a position existing on a contour of the instruction image area, which is remotest from a reference position set in the instruction image area, as a remotest point and setting the input position on the basis of the remotest point; and
   generating input position setting progress information to show the operator the progress of setting the input position and superimposing the input position setting progress information on the image data to be displayed by the image display device.

2. The input position setting method according to claim 1, wherein the display area has an outer circumference, the method further comprising:
   acquiring a differential image between the display image data to be displayed by the image display device and the pickup image data obtained by picking up an image of the display area; and
   determining whether the differential image contacts the outer circumference of the display area by scanning the outer circumference of the display area, and taking the differential image as the instruction image area when the differential image contacts the outer circumference of the display area.

3. The input position setting method according to claim 1, wherein the display area has an outer circumference, and acquiring the image data comprises:
   acquiring a present time differential image between the display image data to be displayed by the image display device and the pickup image data obtained by picking up the image of the display area;
   obtaining a difference between the differential image at the present time and the differential image acquired at a predetermined time before the present time to generate a time differential image to be processed from the image area having the difference; and
   determining whether the time differential image to be processed contacts the outer circumference of the display area by scanning the outer circumference of the display area, and taking the time differential image to be processed as the instruction image area corresponding to the instruction section when the time differential image to be processed contacts the outer circumference of the display area.

4. The input position setting method according to claim 1, wherein detecting the position comprises obtaining a centroid of the instruction image area and setting the obtained centroid as the reference position to obtain the remotest point.

5. The input position setting method according to claim 4, wherein the display area has an outer circumference, and the remotest point is determined by excluding points existing near the outer circumference of the display area and contacting the instruction image area.

6. The input position setting method according to claim 4, wherein the display area has an outer circumference, and wherein when the remotest point cannot be specified for obtaining the remotest point by taking the centroid as the reference position, the remotest point is obtained from points near the outer circumference of the display area and contacting the instruction image area.

7. The input position setting method according to claim 1, wherein the input position setting progress information comprises at least one of information representing the reference position, information representing the input position, and information representing a correspondence relation between the reference position information and the input position information.

8. The input position setting method according to claim 1, wherein when the input position set on the basis of the remotest point is outside the display area, the remotest point is reset so that the input position is inside the display area.

9. An input position setting device for setting an input position for an instruction position by an instruction section on the basis of a pickup image data obtained by picking up an image of a display area when an operator instructs a predetermined position of the display area to be displayed by an image display device with the use of the instruction section, the device comprising:

an instruction image area acquiring unit for acquiring the image area corresponding to the instruction section as an instruction image area from the pickup image data;

an input position setting unit for detecting a position existing on a contour of the instruction image area, which is remotest from a reference position set in the instruction image area, as a remotest point and setting the input position on the basis of the remotest point; and an information display control unit for input position setting progress for generating input position setting progress information to show the operator progress of setting the input position and superimposing the input position setting progress information on the image data to be displayed by the image display device.

10. An information input system which includes an image display device, an image pickup device picking up an image of a display area to be displayed by the image display device, and an input position setting device setting an input position for an instruction position by an instruction section on the basis of a pickup image data when an operator instructs a predetermined position of the display area by the use of the instruction section, wherein the input position setting device comprising:

an instruction image area acquiring unit for acquiring the image area corresponding to the instruction section as an instruction image area from the pickup image data;

an input position setting unit for detecting a position existing on a contour of the instruction image area which is remotest from a reference position set in the instruction image area as a remotest point and setting the input position on the basis of the remotest point; and an information display control unit for input position setting progress for generating input position setting progress information to show the operator progress of setting the input position and superimposing the input position setting progress information on the image data to be displayed by the image display device.

* * * * *